Figure 10:
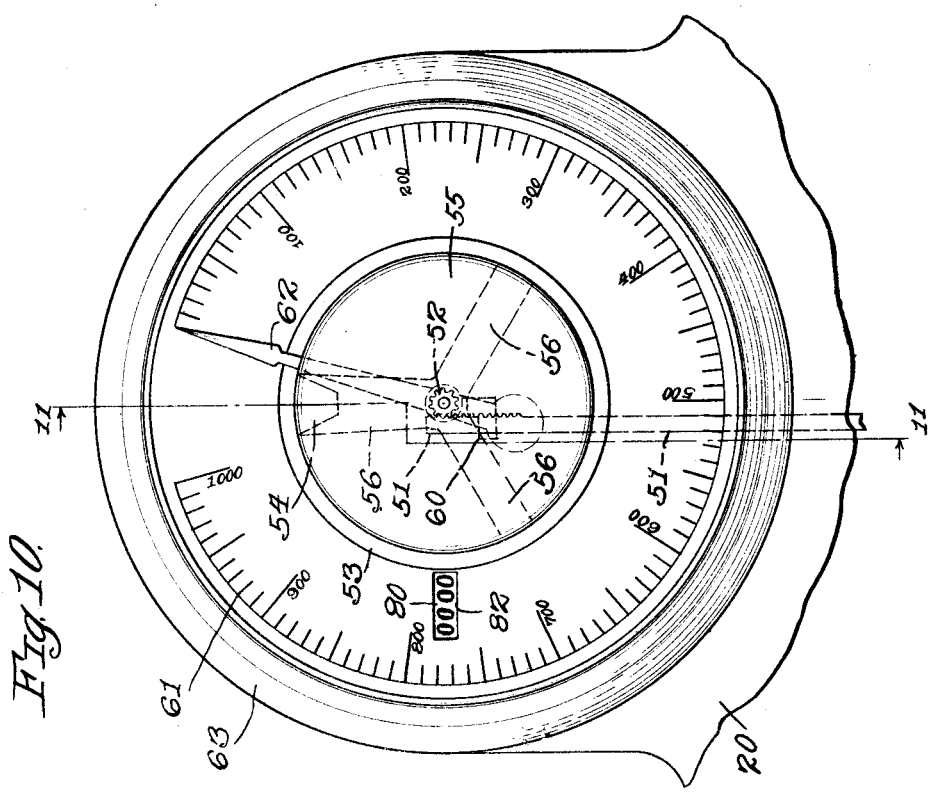

L. A. OSGOOD.
WEIGHING APPARATUS.
APPLICATION FILED MAY 2, 1914.
1,198,650.
Patented Sept. 19, 1916.
3 SHEETS—SHEET 1.
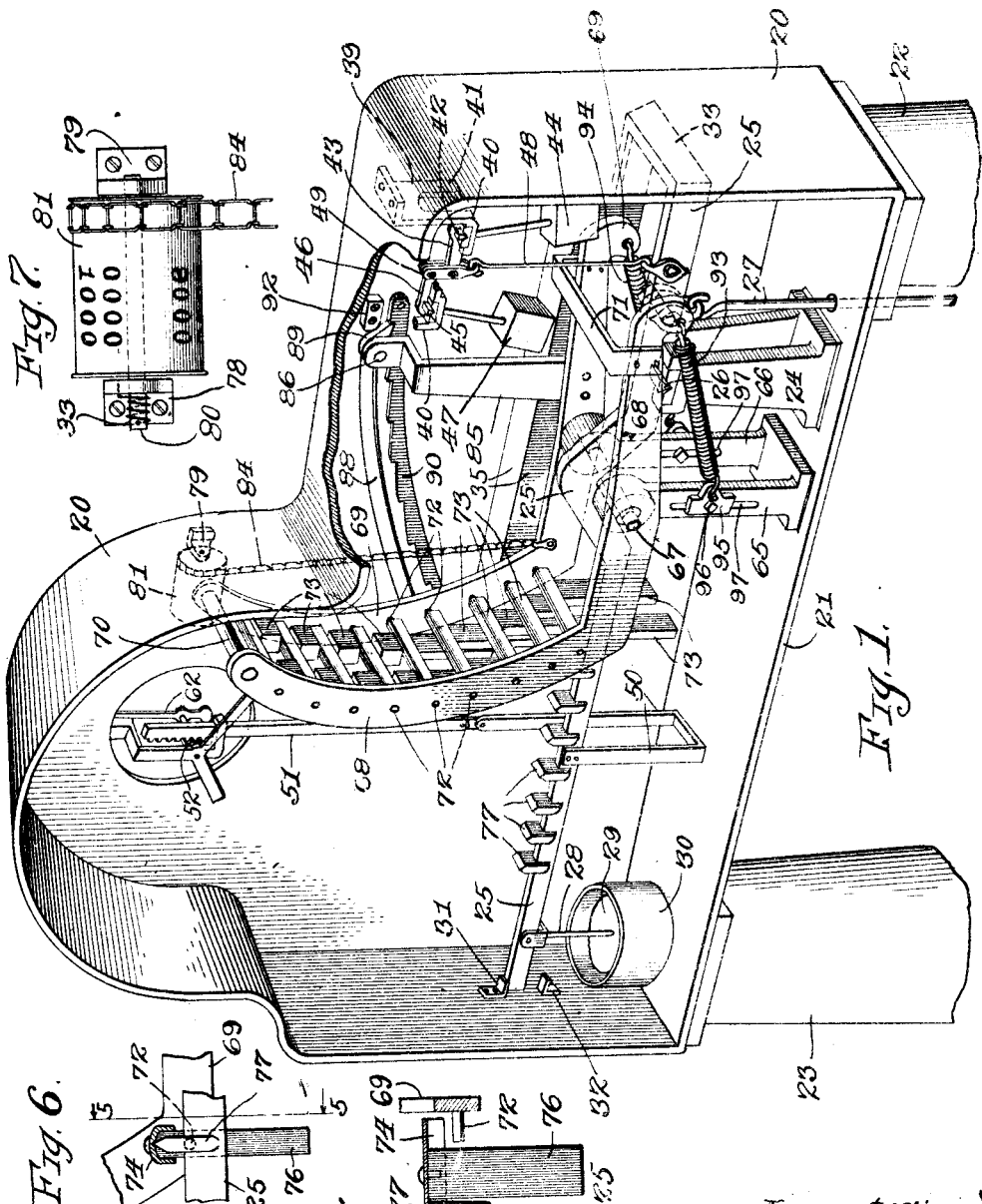

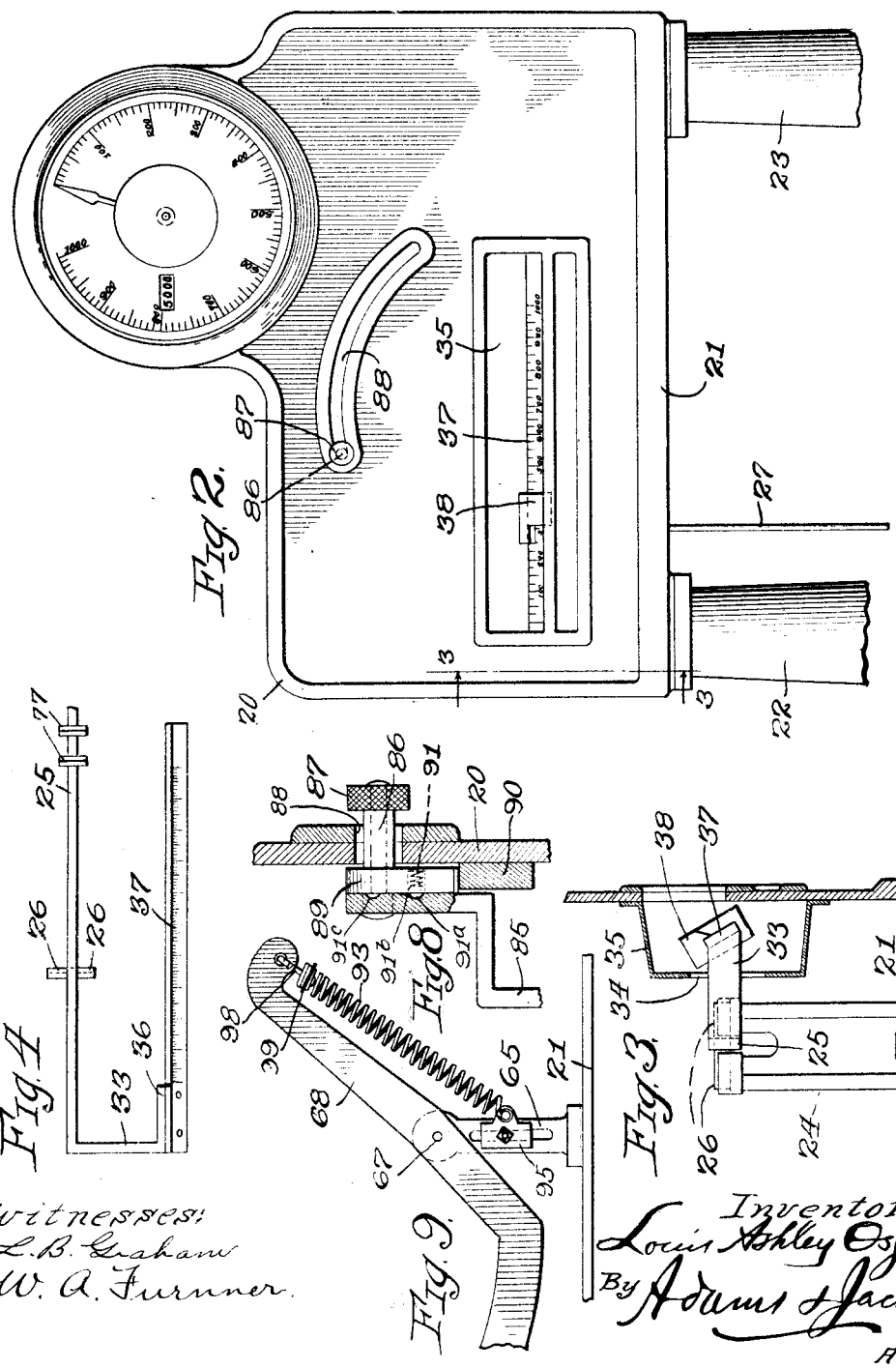

L. A. OSGOOD.
WEIGHING APPARATUS.
APPLICATION FILED MAY 2, 1914.

1,198,650.

Patented Sept. 19, 1916.
3 SHEETS—SHEET 3.

Witnesses:
L. B. Graham
W. A. Furner.

Inventor:
Louis Ashley Osgood
By Adams & Jackson
Attys.

UNITED STATES PATENT OFFICE.

LOUIS ASHLEY OSGOOD, OF CHICAGO, ILLINOIS, ASSIGNOR, BY DIRECT AND MESNE ASSIGNMENTS, TO AMERICAN AUTOMATIC SCALE COMPANY, OF CHICAGO, ILLINOIS, A CORPORATION OF ILLINOIS.

WEIGHING APPARATUS 1,198,650.  Specification of Letters Patent.  Patented Sept. 19, 1916.

Application filed May 2, 1914. Serial No. 835,870.

*To all whom it may concern:*

Be it known that I, LOUIS ASHLEY OSGOOD, a citizen of the United States, residing at Chicago, in the county of Cook and State of Illinois, have invented certain new and useful Improvements in Weighing Apparatus, of which the following is a specification, reference being had to the accompanying drawings.

This invention relates to improvements in weighing apparatus, and particularly to the type of weighing apparatus shown in my application, Serial No. 804,800, filed December 5, 1913. In the use of the apparatus described in that application, it is necessary for the operator to move a weight-carrying lever manually to deposit upon the scale-beam one or more weights, as desired. After the operation of weighing has been completed, it is necessary that the lever be returned again to normal position, withdrawing the weights from the scale-bar, ready for the next-succeeding operation of weighing. My application above referred to discloses the use of counterbalance weights for returning the lever to normal position or for assisting in the return of the lever to normal position. Such counterbalance weights, however, placed upon the projecting end of the lever are incapable of maintaining the lever in balance as one after another of the beam-weights is deposited upon the scale-beam. As will be readily understood, if the counterbalance weights are made sufficiently heavy to counterbalance the lever in its normal position with all of the beam-weights supported by the lever, the result will be that when the lever is released from its lowered position with all of the beam-weights upon the beam, the counterbalance-weights will bring the lever back with a distinct blow, threatening to disengage the beam-weights from position upon the lever and tending to jar or twist the parts out of balance.

It is one of the principal objects of my invention to provide a counterbalancing mechanism which shall maintain the weight-lever substantially in balance throughout its entire stroke, but such as to insure the automatic return of the lever to normal position when it is released after the completion of the weighing operation.

It is another object of my invention to provide a new and improved means for registering in the weighing operation the weight of that portion of the load balanced by the beam-weights normally carried by the weight-carrying lever.

It is another object of my invention to provide a new and improved construction of dial-recording apparatus by reason of which a delicate mounting of the indicating-hand is attained without the necessity for fine adjustments after the parts are completed, which apparatus shall not be likely to require adjustment after its initial assembly.

It is another object of my invention to provide a new and improved arrangement or device for balancing that portion of the load the weight of which is registered by the dial, by reason of which a more compact structure is attained than that heretofore used, while at the same time the advantages of the former constructions are retained.

It is another object of my invention to improve apparatus of this type in sundry details hereinafter pointed out.

The preferred means by which I have accomplished these objects are illustrated in the accompanying drawings and are hereinafter specifically described.

Figure 11:
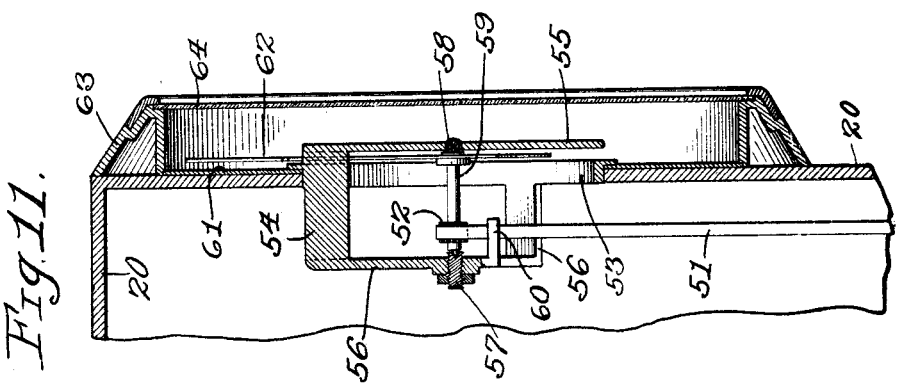

In the drawings, Figure 1 is a rear perspective view of the working parts of my improved device with the rear wall of the casing removed; Fig. 2 is a front elevation of the device; Fig. 3 is a view showing the mounting of the tare-beam, being substantially a section taken on line 3—3 of Fig. 2; Fig. 4 is a top view of the main scale-beam and the tare-beam connected therewith; Fig. 5 is an enlarged detail, being a vertical section across the weight-lever and the scale-beam, being substantially a section taken on line 5—5 of Fig. 6; Fig. 6 is an enlarged detail, being substantially a section taken on line 6—6 of Fig. 5; Fig. 7 is an enlarged detail, being a side view of the drum by which the weight of the major portion of the load is indicated as the beam-weights are successively brought into position upon the beam; Fig. 8 is an enlarged detail showing the mounting of the pawl by which the position of the weight-lever is controlled relative to the rack-bar; Fig. 9 is a fragmentary view showing approximately the position the parts take when the weight-lever is depressed to its lowermost position; Fig. 10 is an enlarged detail, being a front elevation of the dial mechanism; and Fig. 11 is an enlarged detail, being substantially a central vertical section taken on line 11—11 of Fig. 10.

Referring to the several figures of the drawings, in which corresponding parts are indicated by the same reference characters— 20 indicates a casing or housing rising from a base 21 supported by standards 22—23. Mounted upon the base 21 within the housing 20 is a standard 24, between the upper ends of the two arms of which is pivotally mounted a beam 25, being supported therein by means of knife-edge devices 26. The beam 25 has pivotally connected to it near the standard 24 a link 27. which depends therefrom and passes through a suitable opening in the base 21. It is adapted to be connected in any appropriate manner with a scale platform, as is readily understood in the art. The beam 25 has pivotally connected to it near its opposite end a rod 28 carrying at its lower end a piston 29 working loosely in a cylinder 30 adapted to contain water or some other suitable liquid for damping slightly the movement of the beam 25. Upon one end of the casing 20 are mounted stop-devices 31—32 adapted to limit the vertical movement of the scale-bar, as will be readily understood. At its opposite end the beam 25 is provided with an arm 33 extending at right angles through a slot 34 in an auxiliary housing 35 mounted upon the inner surface of the front wall of the housing 20. The arm 33 is turned at right angles at its forward end, such turned end 36 standing in diagonal position, as is best shown in Fig. 4. The bar 36 has suitably connected to it a tare-beam 37 which extends inside of the housing 35 longitudinally thereof. As is shown in Figs. 2 and 4, the tare-beam 37 is graduated and is provided with a tare-balancing weight 38 which can be manually adjusted along the tare-beam through a suitable opening in the front face of the housing 20.

39 indicates a bracket depending from the top of the casing 20 at one end thereof, shown in Fig. 1 and there partly broken away. Said bracket is cut away at its lower end to provide two arms 40—41. Between the arms 40—41, near one end of the bracket, is pivotally mounted by means of the knife-edge devices 42 a bell-crank lever 43 carrying at the lower end of the vertical arm a weight 44. Between the arms 40—41, near the other end of the bracket 39, there is pivotally mounted by means of knife-edge devices 45 a bell-crank lever 46 having mounted upon the lower end of its vertical arm a weight 47. As is shown in said Fig. 1, the arms 40—41 are higher at one end than at the other end, whereby the horizontal arm of the bell-crank lever 46 overlies the horizontal arm of the bell-crank lever 43. The beam 25 has pivotally connected to it in any suitable manner a link 48 which is pivotally connected at its upper end to the horizontal arms of said bell-crank levers by means of a yoke 49. As will be readily understood, when the beam 25 is drawn downward through the medium of the depending link 27, the horizontal arms of the bell-crank levers 43—46 will also be drawn downward, causing the weights 44 and 47 to be thrown outward away from each other and thus resisting downward pull upon the beam. By reason of employing two bell-crank levers oppositely positioned, the resistance afforded by the weights 44—47 to the downward movement of the link 48 is substantially uniform, whether or not the apparatus is accurately leveled. By my expedient of mounting the bell-crank levers to swing longitudinally of the beam instead of laterally thereof as shown in my application above referred to, I am enabled to provide a narrower casing 20 than could otherwise be provided, thus decreasing the cost of manufacture of the device.

50 indicates a yoke depending from the beam 25 and having pivotally connected to the upper end of one of its arms a bar 51 provided at its upper end with a plurality of teeth adapted to engage a pinion 52 for registering the extent of vertical movement of the bar 25, as hereinafter described.

As best shown in Fig. 11, 53 indicates a ring suitably secured in a circular opening in the front wall of the casing 20. The ring 53 is provided at its uppermost point with a laterally-extending block 54 by means of which a circular plate 55 is secured to said ring. The ring 53 is provided on its rear face with a three-armed spider 56. In the construction shown, the ring 53, the block 54, the circular plate 55, and the spider 56 are formed integrally with each other. As best shown in Fig. 11, the spider 56 and the plate 55 are provided at oppositely-disposed points with cup-bearings 57—58, respectively, between which is revolubly mounted a spindle 59, upon which spindle is mounted the pinion 52 above referred to. Projecting laterally from the spider 56 is an arm 60 serving to hold the rack-bar 51 in mesh with the pinion 52, as will be readily understood. Mounted upon the ring 53 is a dial 61 about which the indicating-hand 62, mounted upon the spindle 59, is adapted to revolve as the spindle 59 is turned through the medium of the rack-bar 51, the indicating-hand being free to turn from one side of the block 54 to the other side thereof. The dial and indicating-hand 62 are inclosed by a ring 63 secured in any suitable manner about the dial 61, carrying at its front edge a glass plate 64.

As will be readily understood, when the beam 25 is moved by a downward pull upon the link 27 out of contact with the stop 32 into contact with the stop 31, the indicating-hand 62 will be turned from its zero position upon the dial 61 to the maximum weight position indicated thereon. In the present instance the dial is adapted for recording weights up to a thousand pounds, being therefore graduated from 0 to 1000, the weights 44—47 being arranged for the accomplishment of this purpose. It will be understood that other arrangements might readily be made without departing from the principle of my construction.

Coming now to the means for depositing upon the beam 25 one or more weights for weighing beyond the thousand pound limit of the dial and its coöperating parts,— 65—66 indicate standards rising from the base 21, having mounted in their upper ends a shaft 67 upon the ends of which are journaled the bars 68—69 of a weight-carrying lever. The bars 68—69 are connected together at one end by means of a rod 70 and are connected near their opposite ends by a yoke 71. The bars 68—69 of the weight-lever are provided with pins 72 on their adjacent faces, as best shown in Fig. 5, adapted to support pivotally thereon a series of weights 73. As best shown in Figs. 5 and 6, each of the weights 73 comprises a channel-bar 74 adapted to be slipped into position upon the pins 72 and two weight sections 75—76 secured in any suitable manner in said channeled bar. The beam 25 is provided on its upper face with a series of knife-edge devices 77 upon which the weights 73 are adapted to be deposited successively as the weight-lever is turned from the position shown in Fig. 1, as will be readily understood.

78—79 indicate brackets carried by the front wall of the housing 20, having revolubly mounted between them by means of a shaft 80 a drum 81 directly opposite a suitable slot 82 through the front wall of the casing and through the dial 61, as shown in Fig. 10. The drum 81 is provided with a series of numbers placed thereon in graduated position, in the present construction the numbers being even thousands, running from 0 to 9. The drum 81 is yieldingly held in normal position with the zero mark opposite the slot 82 by means of a spring 83 mounted upon the shaft 80 of the drum. As shown in Fig. 1, the drum 81 has a cable 84 wound about it at one end, said cable, in the construction shown, being in the form of a chain. The chain 84 is connected at its lower end to the weight-lever 68—69, whereby as said lever is turned downward to deposit one after another of the weights 73 upon the beam 25 at the same time the drum 81 is turned through the medium of the cable 84. In the present construction the arrangement is such that, when the lever 68—69 has been turned to deposit one of the weights 73 upon the beam 25, the drum will stand in such a position as to have the number 1000 showing through the slot 82. When two of the weights 73 have been deposited upon the beam, the number 2000 will be opposite the slot 82, and so on through the whole series of weights, the size of the weights 73 and their position upon the beam 25 being such as to counterbalance upon the scale platform the weight indicated by the drum 81, as will be readily understood.

85 indicates an arm rising from the bar 69 of the weight-lever and extending at right angles to said bar. The arm 85 carries at its upper end a short rock-shaft 86 adapted to be turned by a button 87 which is mounted upon the shaft 86 outside of the casing 20, the front face of the casing being provided with a suitable slot 88 through which the shaft 86 extends and along which it can travel in the operation of the weight-lever. Mounted upon the shaft 86 is a pawl 89 adapted to be turned by the operator through the medium of the button 87 into engagement with any one of the teeth of a rack-bar 90 along which said pawl travels as the lever 68—69 is given an operative stroke, the said rack-bar being secured in position upon the inner surface of the front wall of the casing 20. The pawl 89 is free to turn upon the application of a slight turning force to the button 87, but is held normally against turning relative to the standard 85 from either its operative or its inoperative position by means of a spring 91 mounted in the pawl 89 and bearing against a ball 91$^a$ which is adapted to engage either one or the other of recesses 91$^b$—91$^c$ in the standard 85. The casing 20 is provided with a block 92 in position to engage the pawl 89 as the weight-lever is brought to the end of its stroke in clockwise direction in Fig. 1, serving to turn the pawl downward into operative position in engagement with the rack 90.

As will be appreciated from an inspection of Fig. 1, as the weight-lever is turned upon its pivot by means of drawing the arm 85 to the left in said figure through the medium of the button 87, the effective horizontal length of the portion of the weight-lever to the right of its pivot point is gradually decreased. At the same time the effective horizontal length of the portion of the weight-lever at the left of its pivot point is gradually increased, while at the same time the number of the beam weights 73 carried by the weight-lever is decreased by reason of the positioning of such weights successively upon the knife-edge devices 77 of the beam. In order to counterbalance the weight-lever under the varying conditions as above set forth, I have provided springs 93—94 connected at one end to the ends of the bars 68—69 and connected at their other ends to the standards 65—66 below the shaft 67 upon which the weight-lever is pivotally mounted. The connection with the standards 65—66 is accomplished by means of slide-blocks 95 secured by means of bolts 96 at any desired points along vertical slots 97 in said standards. I have found in practice that by the use of springs mounted in the manner just described the weight-lever 68—69 can be maintained throughout its entire stroke substantially in balance with the plates 95 adjusted to their proper vertical position and with the strength of the springs 93—94 properly adjusted. As is best shown in Fig. 9, the connection of the springs 93—94 to the bars 68—69 is effected through the use of a clip 98 having on its free end a plate or washer 99 which is adapted to be adjusted longitudinally of the spring, as will be readily understood.

When a load is placed upon the scale platform, causing a downward pull upon the link 27, the beam 25 is pulled downward at its right-hand end in Fig. 1 against the action of the weights 44—47, raising the left-hand end of the beam 25 and in like manner raising the rack-bar 51 and causing the indicating-hand 62 to rotate relative to the dial for indicating the weight of the object upon the scale platform. If the weight of the object exceeds one thousand pounds, the beam 25 will be brought into contact with the stop 31, as shown in Fig. 1, the indicating-hand 62 being moved at the same time to the limit of its rotation upon the dial. Upon seeing that the weight of the object being weighed exceeds one thousand pounds, the operator will grasp the button 87 and turn the weight-lever 68—69 to deposit upon the beam one or more of the weights 73 until the indicating-hand is moved in counter-clockwise direction in Fig. 10, the pawl 89 being then turned manually by means of the button 87 into engagement with the rack-bar 90, thus holding the weight lever 68—69 in turned position to permit the beam 25 to come to a position of equilibrium. The weight indicated then by the showing of the drum through the slot 82 plus the weight indicated by the dial will be the correct weight of the object being weighed. At the completion of the weighing operation, the pawl 89 is to be turned manually by the operator out of engagement with the rack 90 so that when the weight is removed from the scale platform the springs 93—94 will be free to return the weight-lever 68—69 to normal position, supporting all of the weights 73 free of the beam 25. In order that the springs 93—94 may not bring the weight-lever 68—69 back to normal position with a blow such as would have a tendency to disarrange the working parts or to cause them to lose proper adjustment, it is necessary that the lever 68—69 be kept substantially in balance. At the same time it is important that the springs 93—94 be strong enough that the lever 68—69 will be automatically returned to normal position, bringing the pawl 89 also to normal position at the end of the stroke by its engagement with the block 92. I have found that this particular mode of operation is attainable by the proper adjustment of the strength of the springs and the position of the slide-blocks 95.

What I claim as my invention and desire to secure by Letters Patent is—

1. In a scale, the combination of a beam, a device adapted to carry a plurality of weights and to deposit them successively upon said beam, and differential means acting upon said weight-carrying device adapted to maintain it substantially in counterbalanced condition as said beam weights are deposited upon said beam or lifted therefrom.

2. In a scale, the combination of a beam, a device adapted to carry a plurality of weights and to deposit them successively upon said beam, and differential means acting upon said weight-carrying device adapted to automatically return it when released to normal position supporting all of said beam weights free of the beam and adapted to maintain said weight-carrying device in substantially counterbalanced condition as said beam weights are deposited upon said beam or lifted therefrom.

3. In a scale, the combination of a beam, a lever adapted to carry a plurality of weights and to deposit them successively upon said beam, and differential means acting upon said lever as it is turned adapted to maintain the lever substantially in balance as said beam weights are deposited upon said beam or lifted therefrom.

4. In a scale, the combination of a beam, a device adapted to carry a plurality of weights and to deposit them successively upon said beam, differential means acting upon said weight-carrying device as it is moved, and means for adjusting said differential means whereby it is adapted to maintain said weight-carrying device in substantially counterbalanced condition as said beam weights are deposited upon said beam or lifted therefrom.

5. In a scale, the combination of a beam, a device adapted to carry a plurality of weights and to deposit them successively upon said beam, means for locking said weight-carrying device at any one of a plurality of points against returning to normal position, means adapted to be engaged by said locking means at the end of the return movement of the weight-carrying device for throwing said locking means into operative locking position, and differential means acting upon said weight-carrying device adapted when said locking means is released to automatically return the weight-carrying device to normal position supporting all of said beam weights free of the beam and with the locking means again in operative locking position, and adapted also at the same time to maintain said weight-carrying device in substantially counterbalanced condition as said weights are deposited upon said beam or lifted therefrom.

6. In a scale, the combination of a beam, a device adapted to carry a plurality of weights and to deposit them successively upon said beam, a rack, a pawl movable with said weight-carrying device adapted normally to engage said rack to hold the weight-carrying device against returning to normal position but adapted to be held frictionally out of engagement with said rack, means adapted to be engaged by said pawl at the end of the return movement of the weight-carrying device for throwing said pawl into position to again engage said rack, and differential means acting upon said weight-carrying device adapted when said pawl is released from said rack to automatically return the weight-carrying device to normal position supporting all of said beam weights free of the beam and with the pawl again in operative position and adapted also at the same time to maintain said weight-carrying device in substantially counterbalanced condition as said weights are deposited upon said beam or lifted therefrom.

7. In a scale, the combination of a beam, a device adapted to carry a plurality of weights and to deposit them successively upon said beam, and a spring eccentrically mounted relative to said weight-carrying device having a differential effect thereon whereby said device is maintained in substantially counterbalanced condition as said beam weights are deposited upon said beam or lifted therefrom.

8. In a scale, the combination of a beam, a device adapted to carry a plurality of weights and to deposit them successively upon said beam, a spring eccentrically mounted relative to said weight-carrying device having a differential effect thereon whereby said device is maintained in substantially counterbalanced condition as said beam weights are deposited upon said beam or lifted therefrom, and means for adjusting the position of the spring to vary its eccentricity relative to said weight-carrying device.

9. In a scale, the combination of a beam, a lever adapted to carry a plurality of weights and to deposit them successively upon said beam, and a spring connected at one end to said lever and fixed at its other end eccentrically relative to said lever whereby it is adapted to maintain said lever substantially in balance as said beam weights are deposited upon said beam or lifted therefrom.

10. In a scale, the combination of a beam, a lever adapted to carry a plurality of weights and to deposit them successively upon said beam, a slide-block adjustable toward and from the axis of said lever, and a spring connected at one end to said slide-block and connected at its other end to said lever whereby said lever is maintained substantially in balance as said beam weights are deposited upon said beam or lifted therefrom.

11. In a scale, the combination of a beam, yielding means adapted to resist the movement of said beam, means for indicating the weight of the load balanced by said yielding means, a device adapted to carry a plurality of weights and to deposit them successively upon said beam for counterbalancing a load in excess of the capacity of said first-mentioned yielding means, and means for indicating the weight of that portion of the load counterbalanced by said beam weights, comprising a rotatably-mounted graduated drum and connections between said drum and said weight-carrying device whereby the drum is rotated upon the movement of said weight-carrying device.

12. In a scale, the combination of a beam, yielding means adapted to resist the movement of said beam, means for indicating the weight of the load balanced by said yielding means, a device adapted to carry a plurality of weights and to deposit them successively upon said beam for counterbalancing a load in excess of the capacity of said first-mentioned yielding means, and means for indicating the weight of that portion of the load counterbalanced by said beam weights, comprising a rotatably-mounted graduated drum, a spring tending to hold said drum in normal position at its zero-indicating position, and a cable connecting said drum with said weight-carrying device for rotating the drum as the weights are deposited successively upon the beam.

13. In a scale, the combination of a beam, yielding means adapted to resist the movement of said beam, and means for indicating the weight of the load balanced by said yielding means, said yielding means comprising a pair of bellcrank levers supported opposite each other upon knife-edge devices extending laterally relative to said beam, weights mounted on the downwardly-extending arms of said bellcrank levers, and connections between said bellcrank levers and said beam, the pivotal point of one of said bellcrank levers being higher than that of the other lever whereby the horizontally-extending arm of one of said levers extends over the horizontally-extending arm of the other lever.

14. In a scale, the combination of a ring, a block connected therewith, a spider connected with said ring and extending thereacross, a plate connected to said ring by said block a short distance away from the ring, bearings mounted in said spider and said plate at about the center of the ring, a spindle revolubly mounted in said bearings, and an indicating hand mounted on said spindle between said ring and said plate adapted to revolve from one side of said block to the other side.

15. In a scale, the combination of a ring, a block formed integral therewith, a spider formed integral with said ring and extending thereacross, a circular plate formed integral with said block a short distance away from the ring, bearings mounted in said spider and said plate at about the center of the ring, a spindle revolubly mounted in said bearings, and an indicating hand mounted on said spindle between said ring and said plate adapted to revolve from one side of said block to the other side.

LOUIS ASHLEY OSGOOD.

Witnesses:
W. H. De Busk,
W. A. Furnner.